(12) United States Patent
Gobbi et al.

(10) Patent No.: US 6,612,752 B2
(45) Date of Patent: Sep. 2, 2003

(54) SEALED CONTAINER FOR OPTICAL COMPONENTS AND SEALED FEEDTHROUGH FOR OPTICAL FIBERS

(75) Inventors: Luigi Gobbi, Monza (IT); Francesco Schiattone, Novedrate (IT)

(73) Assignee: Corning OTI SpA, Milan (IT)

( * ) Notice: Subject to any disclaimer, the term of this patent is extended or adjusted under 35 U.S.C. 154(b) by 0 days.

(21) Appl. No.: 09/893,453

(22) Filed: Jun. 29, 2001

(65) Prior Publication Data

US 2002/0037144 A1 Mar. 28, 2002

Related U.S. Application Data

(63) Continuation of application No. PCT/EP99/09640, filed on Dec. 6, 1999.
(60) Provisional application No. 60/121,181, filed on Feb. 22, 1999.

(30) Foreign Application Priority Data

Dec. 29, 1998 (EP) .............................. 98830799

(51) Int. Cl.⁷ ................................ G02B 6/36
(52) U.S. Cl. ............................ 385/94; 385/88; 385/92; 385/138
(58) Field of Search ............................ 385/88, 92, 94, 385/138

(56) References Cited

U.S. PATENT DOCUMENTS

| 4,707,065 A | 11/1987 | Jenkins |
| 4,756,592 A | 7/1988 | Sasayama et al. |
| 4,779,788 A | 10/1988 | Rossberg |
| 5,029,968 A | 7/1991 | Geiser, Jr. et al. |
| 5,177,806 A | 1/1993 | Abbott et al. |
| 5,613,031 A | * 3/1997 | Tanabe et al. ............... 385/138 |
| 5,664,043 A | * 9/1997 | Donaldson et al. .......... 385/138 |
| 5,692,086 A | * 11/1997 | Beranek et al. ............... 385/94 |
| 5,727,105 A | * 3/1998 | Nagata et al. ................ 385/94 |
| 6,081,646 A | * 6/2000 | Filas et al. .................... 385/138 |
| 6,220,766 B1 | * 4/2001 | Yeandle et al. ............... 385/94 |

FOREIGN PATENT DOCUMENTS

| DE | 36 28 391 A1 | 2/1988 |
| EP | 0 337 141 A1 | 10/1989 |
| EP | 0 469 853 | 2/1992 |
| EP | 0 690 322 B1 | 1/1996 |
| EP | 0 872 748 A2 | 10/1998 |
| WO | WO 91/14958 | 10/1991 |
| WO | WO 99/35524 | 7/1999 |
| WO | WO 99/42880 | 8/1999 |

* cited by examiner

Primary Examiner—Akm E. Ullah
Assistant Examiner—Jennifer Doan
(74) Attorney, Agent, or Firm—Svetlana Z. Short; Kevin A. Oliver

(57) ABSTRACT

A protective system for optical components, including a container, at least one optical component fixed inside said container, a length of optical fiber which has a plastic coating and is connected to said at least one optical component, and, an optical feedthrough for said length of fiber, placed in a feedthrough hole in a wall of said container and hermetically fixed therein, said optical feed through comprising an elongated body which has a longitudinal feedthrough hole into which said optical fiber can be placed, and, a portion of said length of fiber being stripped of said coating, wherein said portion of fiber which is stripped of the coating is soldered to one end of said elongated body by means of a metallic solder, such soldering in a surface portion around said portion of fiber being coated with a layer of a polymeric sealant. The polymeric sealant can be an epoxy resin, an acrylic resin, or a silicon resin.

18 Claims, 4 Drawing Sheets

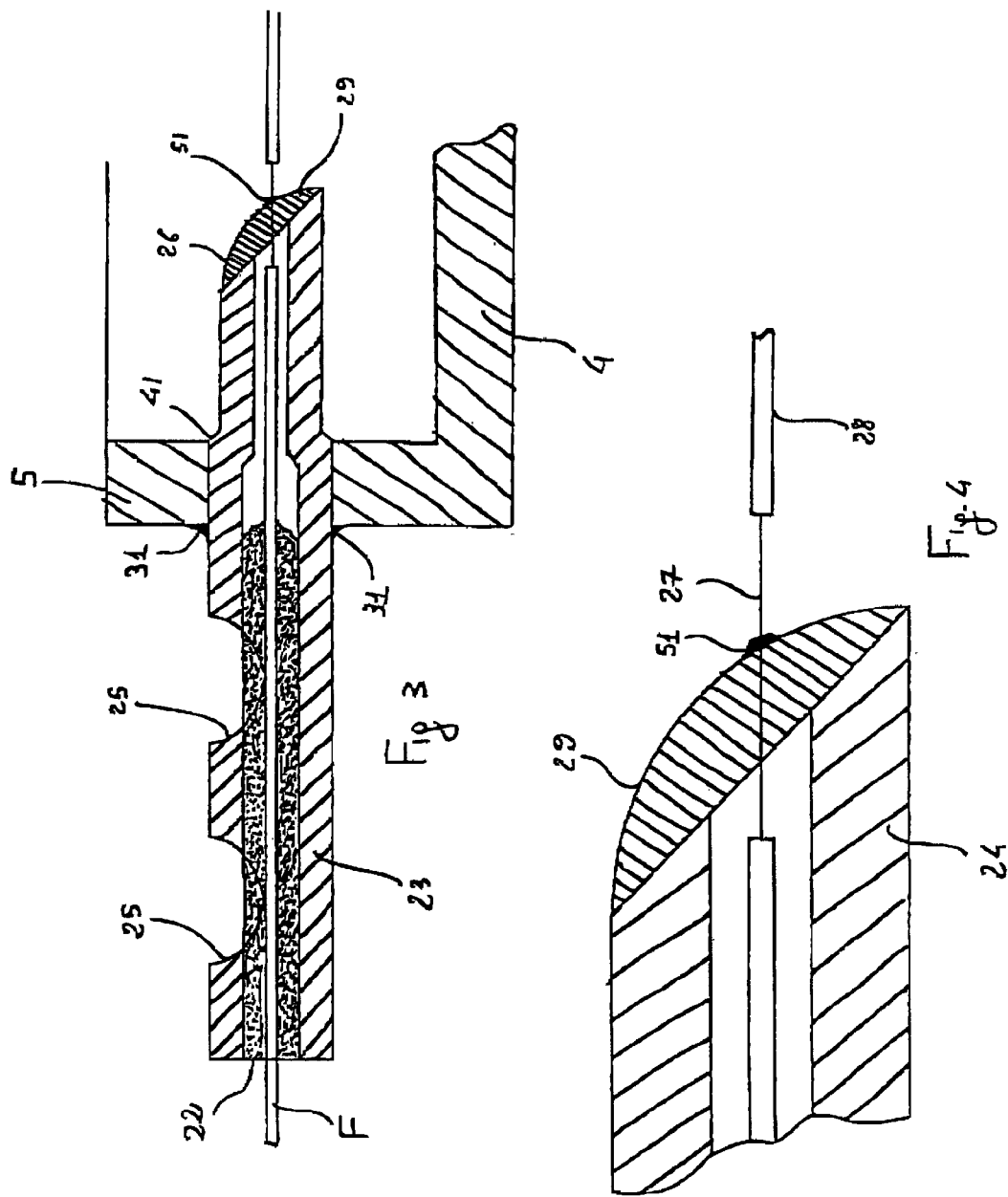

SEALED CONTAINER FOR OPTICAL COMPONENTS AND SEALED FEEDTHROUGH FOR OPTICAL FIBERS

CROSS REFERENCES TO RELATED APPLICATIONS

This application is a continuation of International Patent Application No. PCT/EP99/09640, filed Dec. 6, 1999, in the European Patent Office, which is relied upon and incorporated by reference herein and claims the priority of EP98 830799.7, filed Dec. 29, 1998; further the benefit under 35 U.S.C. § 119(e) based on prior-filed, copending U.S. Provisional Application No. 60/121,181, filed Feb. 22, 1999 is claimed, which is relied upon and incorporated by reference herein.

The present invention relates to a container for optical components. In particular, active and/or passive optical components such as, for example, laser sources, optical splitters, components made with integrated optics and fibre devices can be contained inside a container. In general, for the purposes of the present invention, optical components are considered as being passive or active optical device, for example electrooptic and/or acousto-optic devices which require one or more connections with optical fibres.

In general, these components suffer from contact with particles of water contained in humidity and with other atmospheric agents, for example corrosive agents, which can give rise to a decline in the performance of the component, up to the point at which its correct functioning is compromised. In addition, in certain components, for example lasers, it is necessary-that a defined gas composition inside the container remain unaltered for reasons of reliability.

Examples of optical components which require sealing are, for example, electrooptic modulators made on lithium niobate substrates, and acousto-optic devices. The materials inside the container which suffer most from contact with humidity are, for example, the adhesives used to attach the components and the fibres inside the container.

Thus, what is required is containers which have good sealing, allowing the environment inside them to be kept free of humidity and of other external agents, thus allowing all the components present therein to function correctly. In general, these containers are made of a metallic material, for example stainless steel, Kovar™, metal alloys such as copper-tungsten, for example, and, more generally, materials which do not allow humidity to penetrate into the container, The points at which the passage of humidity or of other agents into the container can take place are the regions in which the electrical and optical connections, referred to hereinbelow as electrical feedthroughs and optical feedthroughs, respectively, with the components present inside the container are located.

Another region in which humidity or other external agents can penetrate into the container, when the said container comprises a base and a lid, is the region of the closure between the lid and the base. In order to ensure sealing in this case, the lid is generally closed using a known technique of brazing along the entire peripheral region of contact. This brazing is carried out, for example, by subjecting the said region of contact to an electrical discharge. The metallic material both of the lid and of the base in the said region fuses and hermetically fixes the two parts together.

For the passage of optical fibres into the container from the outside, the optical feedthroughs are sealed using various techniques.

An optical fibre has a portion made of glass with a core and cladding; generally, the dimensions (diameter) are about 10 µm for the core and about 125 µm for the cladding for monomodal optical fibres. In all the types of fibre, the said portion made of glass has a coating made, for example, of acrylate (acrylic resins) or of elastomeric material in general, which has a minimum diameter of about 250 µm and a maximum diameter of about 400 µm in the case of fibres with maintained polarization. A description of fibres with maintained polarization is given in patent application 98EP-100185.2 in the name of the Applicant.

This coating has pores such that they allow humidity to pass into it and thus, when this coating is not removed in making a feedthrough, they also allow humidity to pass into the container and contact the various optical components. The only portion of the optical fibre which ensures sealing is the portion made of glass, which does not allow any passage of humidity or of other agents.

Thus, in order to seal an optical feedthrough, it is necessary to remove the fibre's acrylate coating in the region which will be inserted through the optical feedthrough, thus exposing the "naked" fibre, i.e. the portion made of glass only.

A technique which effects the sealing involves metallizing the fibre, i.e. coating the naked fibre with a metallic layer which is in direct contact with the glass.

An example of metallization of a fibre is described in U.S. Pat. No. 4,779,788, in which the metallization process takes place after the outer surface of the fibre has been cleaned thoroughly by immersing it, for example, in hot sulphuric acid and washing it with deionized water. The subsequent metallization takes place by means of a process of evaporating metal particles, which settle on the glass of the fibre and become firmly attached thereto, without allowing any humidity to pass between the fibre and the metal.

An example of this technique for sealing an optical feedthrough is described in European patent application EP 690,322, which describes a method for generating a sealed feedthrough, in which a length of the fibre is first stripped of its acrylate coating. The fibre is placed in a cylindrical body having a first portion in which is placed the length of metallized fibre and a second portion, which has a larger diameter than the first portion, in which is placed the length of fibre following the section stripped of coating. The portion of metallized fibre is soldered inside the said first portion of the cylindrical body using a metallic soldering alloy and the portion of fibre with the coating is attached in the second portion of the cylindrical body by means of an adhesive. Next, the cylindrical body, with the fibre attached inside it, is placed in a feedthrough hole appropriately made on a wall of the container and is fixed therein by soldering around the circumference of the feedthrough hole.

The Applicant has found that this technique is expensive, mainly due to the preparation of the metallized fibre, which is a particularly intricate process, since the naked fibre is very fragile and can thus be damaged during the metallization. In addition, the process is carried out using complex machinery. The metallization must be carried outside the container and before the fibre is connected to any of the components housed in the container.

Another technique for sealing an optical feedthrough is described in U.S. Pat. No. 5,177,806, which relates to an optical feedthrough in which the fibre, stripped of the acrylate protective layer, is soldered into a tube by means of glass powder ("glass solder"). In particular, that patent describes an optical feedthrough in which a fibre is maintained in a fixed position in a metal sleeve, while a glass powder is brought to high temperature and then cooled to form a solder inside this sleeve on the naked fibre.

The Applicant has observed that, although this solution eliminates the problems associated with metallization of the fibre, it introduces a high risk of damage to the components inside the container. In fact, the glass powders have relatively high melting points (350° C.–500° C.) and the components generally must not be taken up to such high temperatures. In this case also, it is necessary to carry out the soldering inside the sleeve before connecting the fibre to the components and mounting these components in the container.

When the fibres are of the type with maintained polarization, the "glass solder" in contact with the said fibre can bring about a reduction of the polarization extinction ratio of this fibre.

Another technique for sealing an optical feedthrough, described in patent application EP 469,853, involves using an epoxy resin to prevent humidity from passing into the feedthrough.

In particular, that patent application describes a light guide with an optical fibre for guiding light from an external source into a closed space. The optical fibre is placed in a feedthrough hole formed in a fixing support for the said light guide. The said support has an inlet hole which communicates with the said feedthrough hole. The optical fibre is coated with a surface layer throughout the feedthrough hole, except for the portion which communicates with the said inlet hole, in which it is naked. An epoxy resin is injected into the inlet hole and comes into contact with the fibre and completely occludes the empty spaces, i.e. in the region in which the fibre is free of coating and along the inlet hole.

The support comprises means for fixing it to a wall of the said closed space, which has a communication hole in which the said support is placed and fixed.

The Applicant has observed that, although epoxy resins are highly leaktight, they however have a porosity which, over a long period of time, in environments with a high humidity content and high temperatures (above 30°), can bring about entry of humidity into the container. In addition, epoxy resins have relatively high crosslinking temperatures and coefficients of thermal dilation which are greater than those of optical fibres, which can result in mechanical-type stress on these fibres.

The Applicant has found that one parameter which has an influence on the leaktightness of a feedthrough is the space between the glass portion of the fibre and the hole which needs to be filled with the material for sealing this feedthrough. Thus, by using resin in contact with the fibre the leaktightness and the resistance to humidity of the feedthrough are inversely proportional to the cross-sectional area to be filled. In order to increase the leaktightness, it is necessary to reduce the inside diameter of the feedthrough down to the smallest dimensions of the fibre. The diameter of the fibre with the acrylate coating can be up to about 400 $\mu$m and this measurement thus represents the lower limit for the inside diameter of the feedthrough hole.

The Applicant has found that a combined technique which involves using a metallic soldering alloy on naked fibre to reduce the diameter of the feedthrough and a polymeric sealant in order to carry out the operation for sealing this feedthrough, seals the feedthrough hermetically without compromising the properties of the fibre. This technique allows the polymeric sealant to come into contact with the fibre only in a limited region of the feedthrough, a few tenths of a millimeter, thus resulting in a reduction of the stresses on the fibre. Moreover, by minimizing the area of the circular section filled with polymeric sealant, better sealing is obtained. In addition, the operations required to seal the feedthrough can be carried out after connecting the fibre to the component itself and mounting this component in the container, as the final operation before closing the container.

A first aspect of the present invention relates to a protective system for optical components, comprising:

a container, at least one optical component fixed inside the said container, a length of optical fibre which has a plastic coating and is connected to the said optical component, and an optical feedthrough for the said section of fibre, placed in a feedthrough hole in a wall of the said container and hermetically fixed therein, the said optical feedthrough comprising an elongate body which has a longitudinal feedthrough hole into which the said optical fibre can be placed, a portion of the said length of fibre being stripped of the said coating, characterized in that the said portion of fibre which is stripped of the coating is soldered to one end of the said elongate body by means of a metallic solder, and this soldering, in the surface portion around the said portion of fibre, is coated with a layer of a polymeric sealant.

Preferably, the said polymeric sealant is an epoxy resin.

In particular, the end of the said elongate body at which the soldering is carried out has a surface which is at an angle of less than 90° relative to the base of the container.

Preferably, the said angle is comprised between 30° and 60°.

In particular, the said elongate body is cylindrical and has a rear portion with an outside diameter which is slightly smaller than the diameter of the hole made in the wall of the container, and a front portion with an outside diameter which is smaller than the diameter of the rear portion.

Preferably, at least one transverse notch communicating with the feedthrough hole is present in the said rear portion.

Preferably, the said fibre is a fibre with maintained polarization.

A further aspect of the present invention relates to a sealed feedthrough for optical fibres, comprising an elongate body with a longitudinal feedthrough hole in which can be placed an optical fibre provided with a plastic coating, a portion of the said fibre (F) being stripped of the said coating, characterized in that the said stripped portion of the fibre is soldered to one end of the said body by means of a metallic solder, and this soldering, in the surface portion around the said portion of fibre, is coated with a layer of a polymeric sealant.

Preferably, the said polymeric sealant is an epoxy resin.

In particular, the end of the said elongate body at which the soldering is carried out has a surface at an angle of less than 90° relative to the longitudinal axis of the said elongate body.

Preferably, the said angle is comprised between 30° and 60°.

In particular, the said elongate body is cylindrical and has a rear portion with a first outside diameter, and a front portion with an outside diameter which is smaller than the said first diameter of the rear portion.

Preferably, at least one transverse notch communicating with the said feedthrough hole is present in the said rear portion.

A further aspect of the present invention relates to a method for protecting optical components, comprising the following steps:
- connecting a length of optical fibre to an optical component,
- mounting the said component inside a base of a container,
- placing an optical feedthrough in a hole present in a wall of the base,
- hermetically fixing the said feedthrough in the said wall,
- stripping a portion of the said optical fibre of its plastic coating,
- sealing the said feedthrough,
- hermetically closing the container with a lid,
- characterized in that the said step of sealing the said feedthrough comprises the steps of
- threading the free end of the said fibre into a hole in the said feedthrough,
- soldering, with a metal alloy, the said portion of fibre stripped of the said coating, to the end of the feedthrough which is placed inside the container, and
- placing a layer of a polymeric sealant in the surface portion of the said solder around the said fibre.

Preferably, the step of mechanically fixing the fibre to the inside of the said feedthrough occurs between the steps of threading the free end of the fibre into a hole in the feedthrough and the step of soldering the stripped portion of fibre with a metal alloy.

A further aspect of the present invention relates to a method for sealing an optical feedthrough which connects, by means of an optical fibre, an optical component placed inside a container with the outside, characterized in that it comprises the following steps:
- stripping a portion of the said optical fibre of a layer of plastic coating,
- threading the free end of the said fibre into a hole in the said feedthrough,
- mechanically fixing the fibre inside the said feedthrough,
- soldering, with a metal alloy, the said portion of fibre stripped of the said coating, to the end of the feedthrough placed inside the container,
- placing a layer of a polymeric sealant in the surface portion of the said solder around the said fibre.

A further aspect of the present invention relates to a method for hermetically sealing an optical fibre with respect to a feedthrough, characterized in that it comprises the following steps:
- stripping a portion of the said fibre of the coating so as to expose the glass,
- filling the space between the fibre and the feedthrough with a soldering alloy,
- sealing with a polymeric sealant the portion of soldering alloy in contact with the glass of the fibre.

Further details may be obtained from the following description, with reference to the attached drawings, in which:

FIG. 3 shows an optical feedthrough after the sealing process according to the same embodiment of the present invention;

FIG. 4 shows an enlarged feature of FIG. 3, which reveals the region of sealing of the optical feedthrough according to the same embodiment of the present invention;

Figure 1:
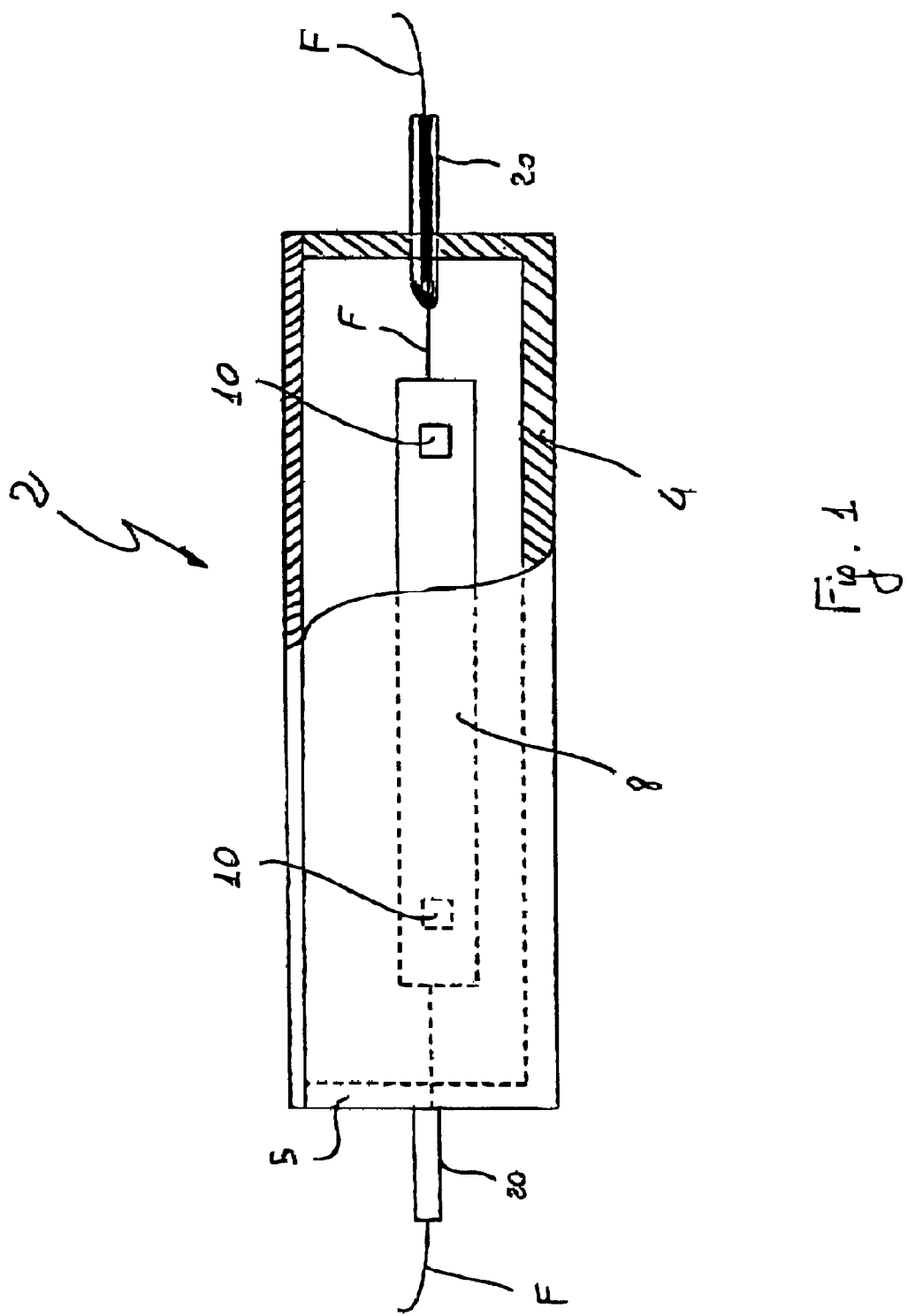
FIG. 1 shows a container for optoelectronic devices, in partial longitudinal cross section, in which the optical feedthroughs are made according to the present invention.

FIG. 1 illustrates an example of a container 2 for optical components, for example of passive or active type, for example electrooptic and/or acousto-optic devices, from which leave optical fibres F connected internally to the container with the said components. In particular, this container for optical components 2 comprises a base 4, which is preferably box-shaped, and a lid 6 which closes onto the said base. It should be noted that the present invention can be applied to any type of container which has a closed body of any shape and a sealed mechanical closing system.

For illustrative purposes, an electro-optic component 8 is shown inside the said base 4 of the container 2, this component being electrically connected by a pair of electrical contacts 10, and connected to two optical fibres F.

This component 8 can be, for illustrative purposes, an electrooptic modulator which also comprises electric feedthroughs (not represented). In addition, passive and active components which are different from each other can be housed inside the container.

The optical connections between the said component and the fibre F are made according to known techniques which are indicated as "pigtailing".

The said optical fibre(s) F leave(s) the container via optical feedthroughs 20, preferably-located on the side walls of the container, which ensure the leaktightness inside the container.

Figure 2:
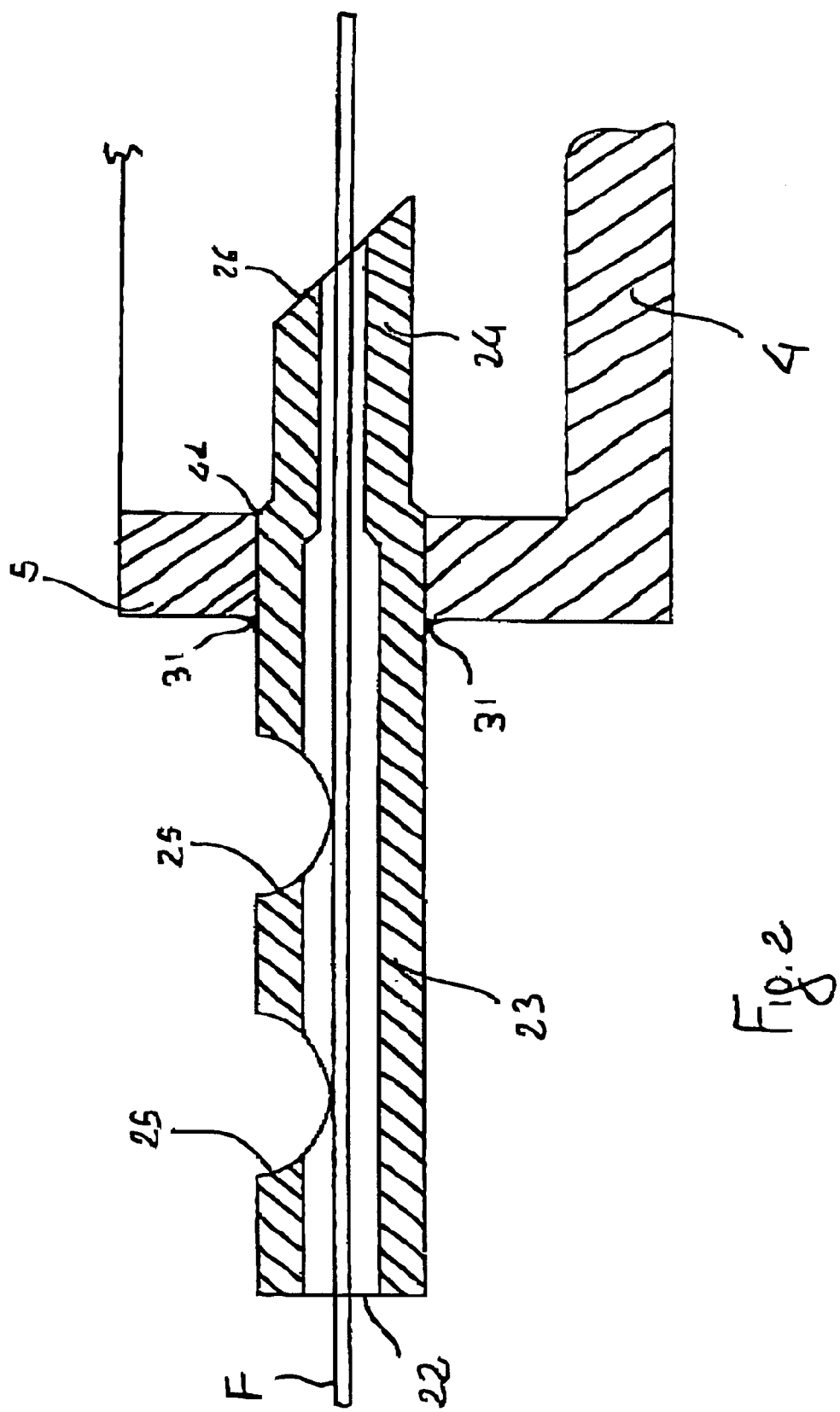
FIG. 2 shows an optical feedthrough, in partial longitudinal cross section, before the sealing process according to one embodiment of the present invention.

FIG. 2 represents an embodiment of the optical feedthrough 20 according to the present invention, in which the said optical feedthrough 20 is soldered in a hole 41 made in the wall 5 of the base 4 of the container, the diameter of which hole is slightly larger than the maximum diameter of the feedthrough, using a metallic soldering alloy 31 (for example gold-tin) preferably placed around the circumference in the region of contact between the feedthrough and the hole on the outer surface of the wall of the base 4. This soldering ensures the leaktightness of the region between the hole 41 and the outer surface of the feedthrough 20. For illustrative purposes, this feedthrough is shown with a cylindrical outer shape, but can equally be made in other shapes, provided that the hole 41 made in the wall of the container is made in the same shape as that of the feedthrough.

This feedthrough preferably comprises a cylindrical body 21 made of metal, for example an iron-nickel-cobalt alloy (Kovar™), a steel or an iron-based alloy, having a longitudinal feedthrough hole 22. The cylindrical body 21 has a rear portion 23, whose diameter is slightly smaller than the diameter of the hole 41 made in the wall of the container, and a front portion 24 whose outside diameter is preferably smaller than the diameter of the rear portion 23. In addition, in this rear portion, the feedthrough hole 22 has a larger diameter than that of the front portion 24.

Transverse notches 25 are present in the rear portion, these notches preferably being of semicircular cross section and of a depth such as to place them in communication with the feedthrough hole 22. In the example illustrated in FIG. 2, there are two notches: however, for the purposes of the present invention, the number of notches can equally well be larger or smaller. The end of the front portion 24 ends with a surface 26 which is oblique relative to the vertical represented in this figure by the wall of the container. This oblique surface has an angle of less than 90° relative to the base of the container 2. Preferably, this angle is comprised between 30° and 60°.

FIG. 3 illustrates the same embodiment of the feedthrough as FIG. 2 after the process of fixing the fibre inside it and the subsequent sealing operation.

In particular, fibre F, comprising a portion made of glass 27 and a coating made of plastic 28, for example an acrylic resin, is placed in the feedthrough 20 advantageously after it has been connected to the device (not represented in this figure but shown for illustrative purposes in FIG. 1) and after this device has been mounted in the container 2. In addition, a plastic tube for mechanically protecting the fibre is preferably inserted in the feedthrough hole 22.

A silicone adhesive is inserted via the notches 25, the function of this adhesive being to mechanically attach the fibre F to the feedthrough 20, but it does not ensure the leaktightness of this feedthrough.

The first step of the sealing process consists in removing the acrylate protective layer 27 from the fibre. This operation can be carried out, for example, with a jet of hot air capable of stripping off this acrylate layer, or alternatively with a laser.

Next, a metallic soldering alloy 29 is deposited close to the region of fibre stripped of the protective coating. The alloy advantageously adheres to the oblique portion 26 inside the container. It is preferable to use indium-based alloys since the mechanical properties of this type of material ensure limited stresses on the fibre. In order to achieve good soldering, it is necessary to bring the region to be soldered to a temperature close to the melting point of the alloy used. A number of indium-based alloys are characterized by relatively low melting points (for example, In Sn, melting point: 118° C.); this fact makes it possible to obtain adhesion between the soldering alloy and the feedthrough without excessively heating the container and the components contained therein.

Advantageously, the indium-based alloys at least partially adhere to non-metallic substrates such as, for example, glass or ceramic. This property, associated with the formation of a thin layer of oxide between the alloy and the substrate, ensures a certain degree of adhesion between the alloy and the naked fibre.

Next, one drop of a polymeric sealant 51 is placed on the naked fibre close to the metallic soldering alloy 29. This sealant is hardened by, for example, raising the temperature or exposure to light, for example ultraviolet light.

A polymeric sealant which is suitable for this purpose is, for example, an epoxy resin known as H77 Epo-tek produced by Epoxy Technology Inc. (USA).

FIG. 4 in particular shows the region of the soldering between the fibre F and feedthrough 20. The polymeric sealant, in this case the epoxy resin, ensures leaktightness between the naked fibre and the metallic soldering alloy 29 and thus ensures the leaktightness of the container.

In general, the term polymeric sealant means a material which is capable of ensuring a high level of leaktightness; in particular a resin, for example an epoxy resin or an acrylic resin or a silicone resin. Preferably, it is an epoxy resin.

Figure 5:
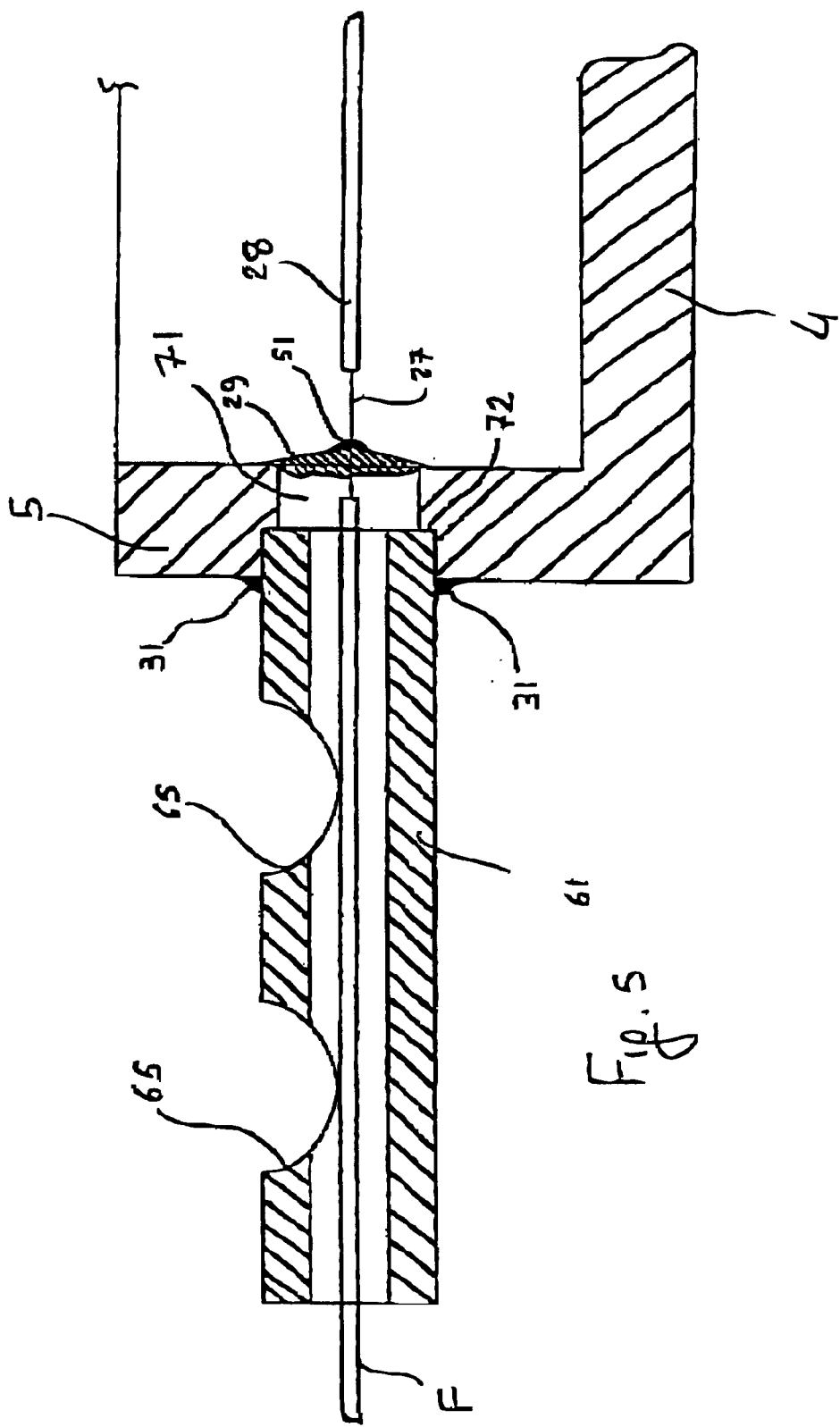
FIG. 5 shows an optical feedthrough, in partial longitudinal cross section, after the sealing process according to a further embodiment of the present invention.

FIG. 5 represents an optical feedthrough according to another embodiment of the present invention, in which a feedthrough 60, which is preferably cylinder-shaped, is soldered in a hole 71 made in the wall 5 of the container. This hole has a portion in which the diameter is slightly larger than the maximum diameter of the feedthrough, and a portion of smaller diameter so as to form a stop ring 72 inside the wall of the container. The feedthrough 60 is inserted into this hole 71 from the outside until it reaches the stop ring 72. Using a metallic soldering alloy 31 (for example gold-tin) preferably placed around the circumference in the region of contact between the feedthrough 60 and the hole 71 on the outer surface of the wall 5, the feedthrough is fixed to the wall of the container and leaktightness of the region between the hole 71 and the outer surface of the feedthrough 60 is ensured.

This feedthrough preferably comprises a cylindrical body 61 which has a longitudinal feedthrough hole 62. The cylindrical body has transverse notches 65, preferably of semicircular cross section, the depth of which is such as to place them in communication with the feedthrough 62. In the example illustrated in FIG. 5, there are two notches: however, in the scope of the present invention, the number of notches may equally well be larger or smaller.

In this embodiment, the fibre F, comprising the portion made of glass 27 and the acrylate coating 28, is inserted into the feedthrough 60 advantageously after it has been connected to the device (not represented in this figure but shown for illustrative purposes in FIG. 1) and the device itself mounted on the base 4 of the container 2.

An adhesive is inserted via the notches 25, the function of this adhesive being to mechanically attach the fibre F to the feedthrough 20, but it does not ensure the leaktightness of this feedthrough.

The first step of the sealing process consists in removing the acrylate protective layer 27 from the fibre. This operation can be carried out, for example, with a jet of hot air.

Next, a metallic soldering alloy 29 is deposited close to the region of fibre stripped of the protective coating. The alloy adheres to the naked fibre 26 and to the inner walls of the container, and also at least partially fills the inner portion of the hole 71 not occupied by the feedthrough 60. In a similar manner to that of the above embodiment, a drop of polymeric sealant 51 is placed on the naked fibre close to the metallic soldering alloy 29.

It should be noted that, in both embodiments, the mechanical gripping of the fibre in the feedthrough is not achieved by the soldering 29, but by the adhesive 30 inserted into the said notches. Thus, in the event of accidental tearing or of tensile stresses on the fibre outside the container, the sealing of the feedthrough is not affected thereby in any way.

In addition, after sealing the feedthrough, it is advantageous to coat the region of fibre remaining naked inside the container with a layer of protective silicone adhesive.

Optionally, before carrying out the metallic soldering on the feedthrough, it is possible to insert this silicone adhesive into the feedthrough hole, so as to protect, inside the feedthrough, any regions of the fibre remaining naked, i.e. which will not be coated with the solder.

A feedthrough according to this embodiment was tested by carrying out the tests according to a process described in standard MIL-STD-883E, the purpose of which is to check the leaktightness of containers for optical, electronic and semiconductor components.

Five containers of the same type, in which was inserted a pair of feedthroughs made according to the present invention, were tested. In particular, these containers are box-shaped and made of stainless steel; in addition, they have a length of 108 mm, a width of 15 mm and a height of 10 mm. The optical feedthroughs are made of an iron-nickel-cobalt alloy (Kovar™) and are placed on opposite walls of the container at a height of 5 mm from the base in the centre of each wall. All the walls of the container have a substantially constant thickness of about 2 mm.

In particular, using a Panda™ type fibre with maintained polarization, which is a type of fibre that is particularly sensitive to mechanical forces, the following were measured:

the polarization extinction ratio in the optical fibre [dB];
the ratio of infiltration or of leakage per unit of time ("leak rate") [atm cm$^3$/sec].

The test carried out on the containers ("leak test") consists in placing the container in a helium-saturated atmosphere in which is produced a pressure of greater than 2 atm at constant temperature for a period of more than 4 hours. This procedure is described in detail in the abovementioned standard and is known as "bombing". In this way, the gas forcibly penetrates into this container and, once the container is removed from the pressurized atmosphere, the amount of gas which leaks from the container into the atmosphere can be measured.

Substituting the selected values of pressure and duration of bombing, in the formula described in the standards, gives the specification relating to the leaktightness, i.e. the "leak rate" value below which the container can be considered as being effectively leaktight.

The 5 containers tested had an internal volume of greater than 0.4 cm$^3$.

Under the experimental conditions chosen (pressure of 2 atm and duration of 4 hours), the threshold value is $3 \times 10^{-8}$ atm cm$^3$/sec. Helium was used as tracer gas in these tests.

In all of the containers, the "leak rate" value was less than the threshold value, and the results are collated in the following table:

| Container | C168 A18 | C150 A18 | C130 A6 | C162 A11 | C176 A07 |
|---|---|---|---|---|---|
| Duration | 10 d | 10 d | 10 d | 10 d | 10 d |
| Nitrogen (%) | 87.9 | 87.5 | 87.8 | 88.8 | 87.3 |
| Helium (%) | 9.17 | 9.04 | 8.97 | 8.96 | 9.38 |
| Humidity (%) | 1 | 1.36 | 0.9 | 0.6 | 0.9 |
| Leak rate | $2.4 \times 10^{-9}$ | $9.7 \times 10^{-9}$ | $3.6 \times 10^{-9}$ | $8.5 \times 10^{-9}$ | $1 \times 10^{-9}$ |
| Comments | leaktight | leak-tight | leak-tight | leak-tight | leaktight |

It is observed that the percentages of nitrogen, helium and humidity indicated in the table are measured, at the end of the test (10 days) by making a hole in the container and measuring the properties of the gas contained therein.

In particular, it is seen from the table that the five containers were leaktight (leak rate<$3 \times 10^{-8}$).

The result of the test, carried out on the same five containers, of the polarization extinction ratio for the Panda™ fibre used is represented by the average value of this ratio for the five containers. This average value of the variation of this ratio is 0.9 dB (for 0° C./70° C. heating cycles) for a pair of feedthroughs placed in opposite walls of the container, and thus about 0.45 dB per feedthrough. This variation is typically negligible for this type of fibre.

What is claimed is:

1. A protective system for optical components, comprising:
    a container,
    at least one optical component fixed inside said container,
    a length of optical fibre which has a plastic coating and is connected to said at least one optical component, and,
    an optical feedthrough for said length of fibre, placed in a feedthrough hole in a wall of said container and hermetically fixed therein, said optical feed through comprising an elongated body which has a longitudinal feedthrough hole into which said optical fibre can be placed, and,
    a portion of said length of fibre being stripped of said coating, wherein:
        said portion of fibre which is stripped of the coating is soldered to one end of said elongated body by means of a metallic solder, such soldering in a surface portion around said portion of fibre being coated with a layer of a polymeric sealant to provide contact between said solder and said polymeric sealant.

2. The system according to claim 1, wherein said polymeric sealant is at least one of an epoxy rest, an acrylic resin and a silicon resin.

3. The system according to claim 1, wherein the end of said elongated body at which soldering is carried out has a surface is at an angle of less than 90° relative to a base of the container.

4. The system according to claim 1, wherein the end of said elongated body at which soldering is carried out has a surface is at an angle between 30° and 60°.

5. The system according to any one of claims 1, 2, 3, or 4, wherein said elongated body is cylindrical and has a rear portion with an outside diameter slightly smaller than a diameter of the hole made in the wall of the container and a front portion with an outside diameter which is smaller than the outside diameter of the rear portion.

6. The system according to claim 5, wherein at least one transverse notch communicating with the feedthrough hole is present in said rear portion.

7. The system according to claim 1, wherein said fibre is a fibre with maintained polarization.

8. A sealed feedthrough for optical fibres, comprising:
    an elongated body with a longitudinal feedthrough hole for receiving an optical fibre provided with a plastic coating, and,
    a portion of said fibre stripped of said coating, wherein:
        said stripped portion of the fibre is soldered to one end of said body by means of metallic solder, such soldering, in a surface portion around said portion of fibre, being coated with a layer of a polymeric sealant to provide contact between said solder and said polymeric sealant.

9. The feedthrough according to claim 8, wherein said polymeric sealant is at least one of an epoxy resin, an acrylic resin and a silicon resin.

10. The feedthrough according to claim 8, wherein the end of said elongated body at which soldering is carried out has a surface which is at an angle of less than 90° relative to the longitudinal axis of said elongated body.

11. The feedthrough according to claim 8, wherein the end of said elongated body at which soldering is carried out has a surface which is at an angle between 30° and 60°.

12. The feedthrough according to any one of claims 8, 9, 10, or 11, wherein said elongated body is cylindrical and has a rear portion with a first outside diameter and a front portion with an outside diameter which is smaller than said first diameter of the rear portion.

13. The feedthrough according to claim 12, wherein at least one transverse notch communicating with the feedthrough hole is present in said rear portion.

14. A method for protecting optical components, comprising the steps of:
    connecting a length of optical fibre to an optical component,
    mounting said component inside a base of a container,
    placing an optical feedthrough in a hole present in a wall of the container,
    hermetically fixing said feedthrough in said wall, stripping a portion of said optical fibre of a plastic coating, sealing said feedthrough, and hermetically closing the container wit a lid, wherein:

said step of sealing said feedthrough comprises the steps of:

threading a free end of said fibre into a hole of said feedthrough, soldering, with a metal alloy, said portion of said fibre stripped of said coating to an end of the feedthrough which is placed inside the container, and placing a layer of polymeric sealant on a surface portion of said solder around said fibre to provide contact between said solder and said polymeric sealant.

15. The method for protecting optical components according to claim 14, comprising, between the step of threading the free end of said fibre into a hole of said feed through and the step of soldering the stripped portion of fibre with a metal alloy, the step of:

mechanically fixing the fibre to an inside of said feedthrough.

16. The method for protecting optical components according to claim 14, comprising, between the step of stripping a portion of said optical fibre and the step of soldering the stripped portion of fibre with a metal alloy, the step of:

mechanically fixing the fibre to an inside of said feedthrough.

17. A method for sealing an optical feedthrough which connects, by means of an optical fibre, an optical component placed inside a container with an outside, comprising the steps of:

stripping a portion of said optical fibre of a layer of plastic coating, threading a free end of said fibre into a hole of said feedthrough, mechanically fixing the fibre inside said feedthrough, soldering, with a metal alloy, said portion of fibre stripped of said coating, to the end of the feedthrough placed inside the container, and, placing a layer of a polymeric sealant on a surface portion of said solder around said fibre to provide contact between said solder and said polymeric sealant.

18. A method for hermetically sealing a glass-containing optical fibre and a feedthrough, comprising the steps of:

stripping a portion of said optical fibre of a coating so as to expose glass, filing a space between the fibre and the feedthrough with a soldering alloy, and, sealing with a polymeric sealant a portion of the soldering alloy in contact with the glass on the fibre to provide contact between said solder and said polymeric sealant.

* * * * *

UNITED STATES PATENT AND TRADEMARK OFFICE
CERTIFICATE OF CORRECTION

PATENT NO. : 6,612,752 B2  Page 1 of 1
DATED : September 2, 2003
INVENTOR(S) : Luigi Gobbi et al.

It is certified that error appears in the above-identified patent and that said Letters Patent is hereby corrected as shown below:

Column 10,
Line 10, insert -- meric sealant is at least one of an epoxy resin, an acrylic resin -- instead of "meric sealant is at least one of an epoxy rest, an acrylic resin"

Signed and Sealed this

Third Day of February, 2004

JON W. DUDAS
*Acting Director of the United States Patent and Trademark Office*